United States Patent [19]

Gulbrandson et al.

[11] Patent Number: 5,717,273
[45] Date of Patent: Feb. 10, 1998

[54] INSULATING ARMATURE END TURN CAP

[75] Inventors: William E. Gulbrandson, Clear Lake; Jerome J. Lemmer, Oakdale, both of Minn.

[73] Assignee: Onan Corporation, Minneapolis, Minn.

[21] Appl. No.: 608,294

[22] Filed: Feb. 28, 1996

[51] Int. Cl.$^6$ ............................................. H02K 3/46
[52] U.S. Cl. ..................... 310/260; 310/71; 310/194; 310/270
[58] Field of Search .......................... 310/260, 270, 310/71, 42, 194

[56] References Cited

U.S. PATENT DOCUMENTS

| | | | |
|---|---|---|---|
| 3,293,472 | 12/1966 | Stevens | 310/260 |
| 4,484,096 | 11/1984 | Sauerwein et al. | 310/260 |
| 4,554,475 | 11/1985 | Sisk | 310/208 |
| 4,752,708 | 6/1988 | Jager et al. | 310/260 |
| 5,235,231 | 8/1993 | Hisey | 310/259 |

*Primary Examiner*—Steven L. Stephan
*Assistant Examiner*—Tran Ngoe Nguyen
*Attorney, Agent, or Firm*—Merchant, Gould, Smith, Edell, Welter & Schmidt, P.A.

[57] ABSTRACT

The present invention is an insulating end cap which provides mechanical support to the end turns of the coils. The mechanical support provides insulation by axially, radially and diametrically separating end turns of coils within phases, and end turns of coils of different phases. Additionally, mechanical insulative support is given to coil-to-coil crossovers and also to coil-to-terminal connections. The end cap may be formed integrally by an injection molding method. Further, the end cap removes the need for a cuffed, grain-oriented insulative lamination stack slot liner by providing support for the liner. The liner becomes independent of stack length. The end cap is designed to be symmetrical and one end cap design is suitable for use at both ends of an armature.

11 Claims, 5 Drawing Sheets

INSULATING ARMATURE END TURN CAP

BACKGROUND OF THE INVENTION

1. Field of the Invention

The present invention relates generally to electrical machinery and more specifically to an end cap for an armature.

2. Description of Related Art

It is well known that armatures in electrical machines are formed from a stack of laminations in which slots have been cut to receive the windings. The windings must be insulated from the lamination stack and it is common to line the lamination stack slots with insulative paper liners. However, the problem of providing insulation at the ends of the stack is more complicated since insulation also has to be provided between the winding coils which cross over one another at the stack ends and also between the crossovers leading from one coil in a phase to the next coil.

An armature typically has a set of coils for each phase, the coils within a set being positioned with uniform spacing around the armature. A coil set for a phase is interleaved with coil sets for other phases around the armature. Each coil in a set is wound separately from the other coils in that set, with coil-to-coil crossovers being provided for electrical connection to other coils in the set. It is important to hold the end turns of the coil sets in particular spacing relationship with each other at the ends of the armature in order to provide needed insulative clearances.

The conventional approach for assembling an armature is first to insert paper liners into the slots in the lamination stack. The paper liners are commonly cuffed at either end. The cuffs expand from slot ends after the liner has been inserted, thus holding the liner in place. The liner has to be cut with the grain running perpendicular to the slot in order to withstand the stresses imposed on the liner during the assembly process. Consequently, paper rolls of different widths need to be used to accommodate armatures of different thickness.

The coils are inserted in the slots, with the end turns hanging off the ends of the lamination stack. Insulative sleeving is put on the coil-to-coil crossovers in order to insulate the crossovers from other phases. Extension leads, for connecting to the terminals, are crimped on to the coil extensions and insulated. The ends of the armature are then formed, either with a press or a mallet, into a predetermined shape. Insulating paper phase blankets are inserted between the coil end turns to insulate one phase from the other. The extension leads are then secured in place with lacing cord, along with the crossovers and end turns. Prior to the varnishing step, U-shaped paper wedges are inserted into the slots to prevent subsequent movement of the coil wires when a voltage is applied, and to provide insulation of the exposed lamination stack not covered by the slot liner.

The assembly of an armature using conventional methods requires the use of many parts, including lacing cords, phase blankets, slit sleeve insulation, splices and the like, and requires a significant labor effort to perform the insulation stripping, to connect winding extensions to leads and to form the end turns. There therefore exists a need for a new end cap which can reduce the number of parts and the labor required for assembling an armature. In addition, there is a need for an end cap which removes the need for cuffed, and grain-oriented, slot liners.

SUMMARY OF THE INVENTION

This invention aims to reduce the parts and labor required for assembling an armature for an electric motor. In particular, the present invention removes the need for phase blankets, lacing cord, splices, and splice ties, and avoids the use of insulation sleeves on crossovers, winding extensions, and lead splices. The present invention also reduces the labor required to assemble the armature.

The present invention is an insulating armature end cap which provides mechanical support to the end turns of the coils. The mechanical support provides insulation by axially, radially and diametrically separating end turns of coils within phases, and end turns of coils of different phases. Additionally, mechanical insulative support is given to coil-to-coil crossovers and also to coil-to-terminal connections. The end cap may be formed integrally, or independently, by an injection molding method. Further, the end cap removes the need for a cuffed insulative lamination stack slot liner by providing support for the liner. The liner becomes independent of stack length. The end cap is designed to be symmetrical and one end cap design is suitable for use at both ends of an armature.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE EMBODIMENT

Figure 1:
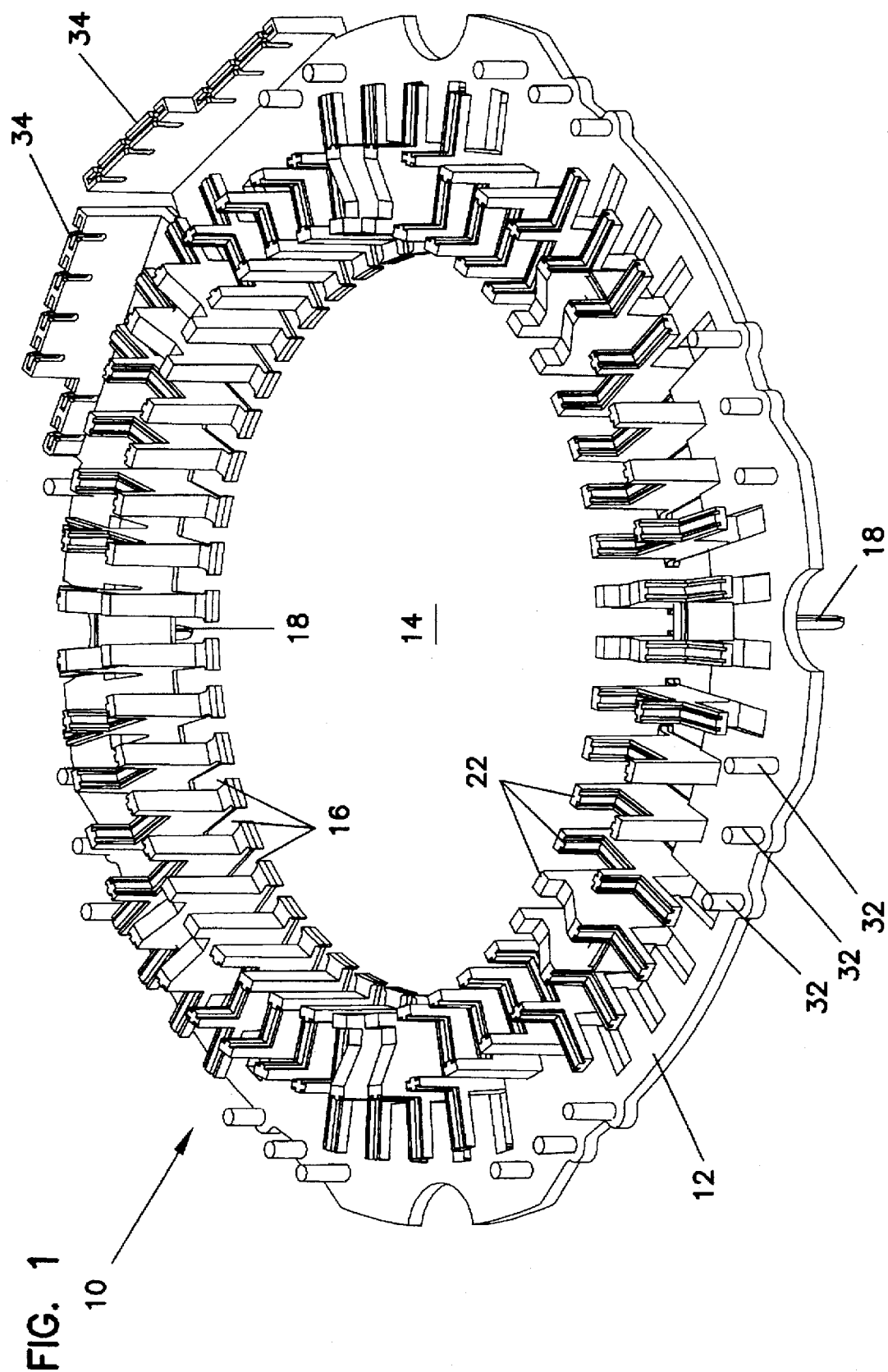
FIG. 1 shows the insulating armature end cap according to the principles of the present invention.
Figure 2:
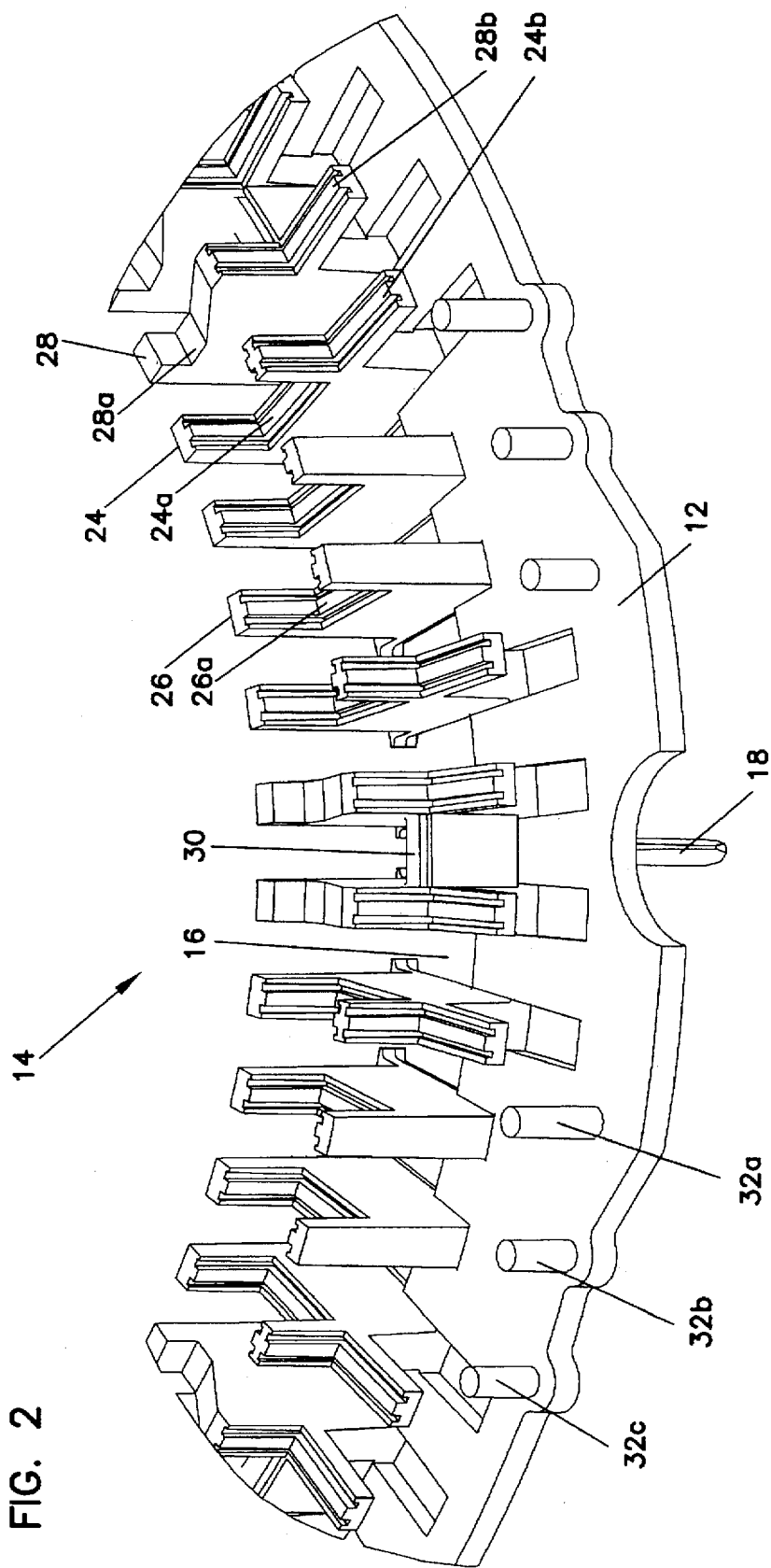
FIG. 2 shows a magnified view of the top side of the insulating end cap and detail of the walls for insulatively supporting coil sets.
Figure 3:
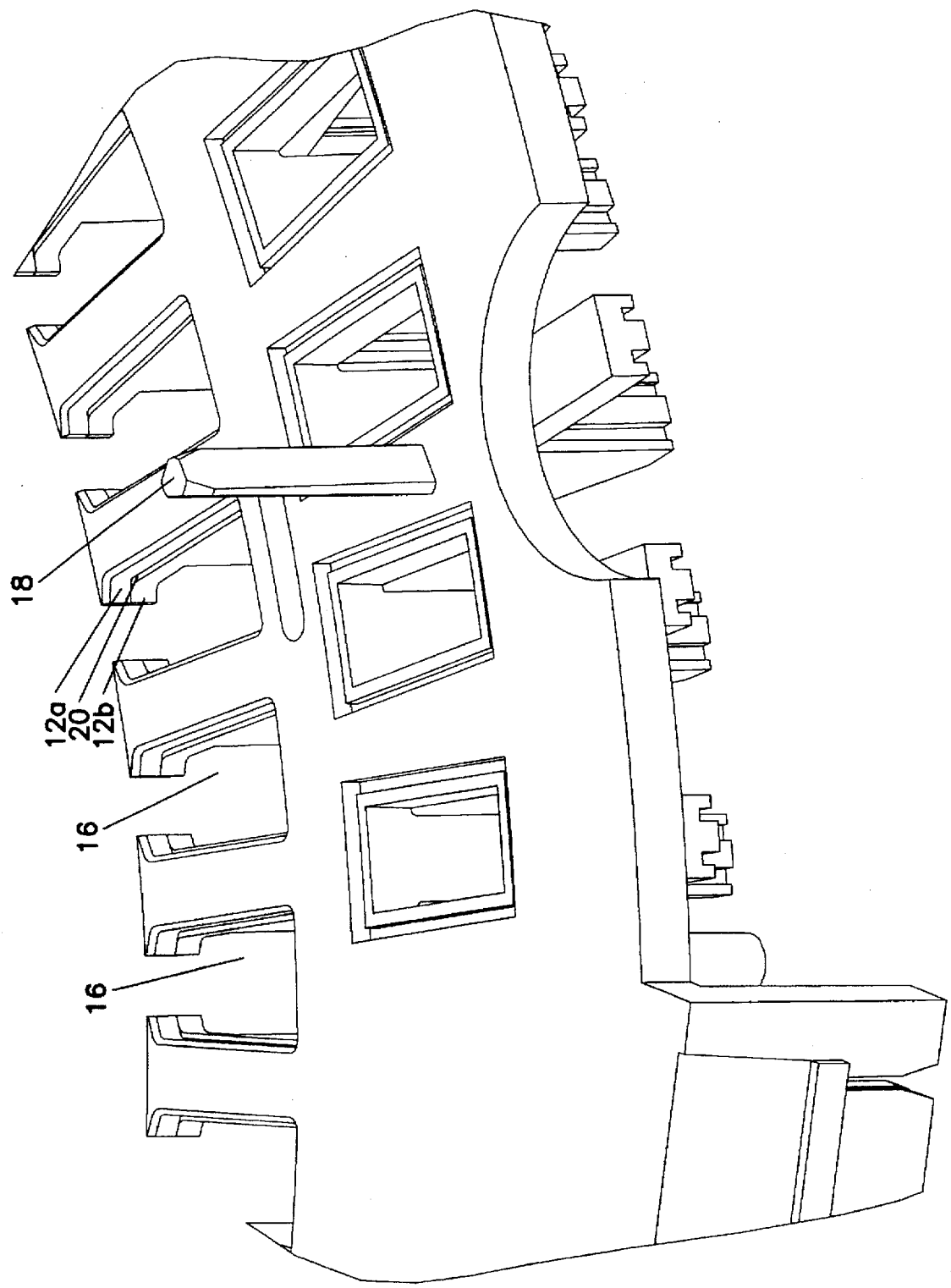
FIG. 3 shows detail of the underside surface of the end cap.

Referring now to the figures and, more particularly, to FIGS. 1–3, there is illustrated a preferred embodiment of an insulating armature end turn cap, generally designated by the reference numeral 10, for use with a lamination stack for an armature. The end cap 10 is formed from a plate 12 having two levels, 12a and 12b, and having a centrally located, circular hole 14 for receiving a rotor. Extending radially outward from the hole 14 is a plurality of slots 16 cut into the plate 12. These slots 16 have the same contour as the slots in the armature lamination stack and are identical in number. The slots 16 are positioned on the plate 12 so that the slots 16 register with the slots of the armature lamination stack when the end cap 10 is placed on the end of the armature. Forty-eight slots 16 are shown, to match an armature with forty-eight lamination stack slots, corresponding to a three phase armature having 8 coil sets for each phase. However, the number of slots in an armature could be either greater or fewer, and the number of slots 16 in the end cap 10 is adjustable to match the number of armature slots.

Flange portions 20 are preferably disposed on the edge of each slot 16 at level 12b. The flange portions 20 are formed by providing a slot width on level 12b of the plate 12 which is slightly smaller than the slot width on level 12a. The purposes of the flange portions 20 will be discussed hereinbelow.

On the rear side of the plate 12 is disposed a plurality of assembly posts 18. The assembly posts 18 are preferably adapted to fit into corresponding holes in the armature lamination stack, so that the end cap 10 can be securely mounted in the correct position on the lamination stack when the armature is assembled.

On the upper side of the plate 12, are positioned a plurality of intervening walls 22 disposed around the periphery of the hole 14 and extending radially outward from a position intermediate the slots 16 to a position beyond the outer radius of the slots 16. The walls 22 are provided to give mechanical support to the coil sets of the armature while concurrently separating coil sets as they enter and exit the slots. In addition, the walls 22 insulate one coil set from another by maintaining a spatial relationship between coil sets so that there is no physical contact between coil sets.

There are provided three types of wall 22, a first wall 24, a second wall 26, and a third wall 28. The first wall 24 has an upper, tangential channel portion 24a, and an outwardly facing cantilevered portion 24b. The second wall 26 has an upper, tangential channel portion 26a. The third wall 28 has an upper tangential groove portion 28a raised to a height higher than the bottom of the tangential channel portions 24a and 26a. The third wall 28 also has an outwardly facing cantilevered portion 28b. The cantilevered portions 24b and 28b are preferably positioned to have a height approximately equal to the height of the bottom of the upper tangential channel portions 24a and 26a. The walls 24, 26 and 28 are arranged clockwise round the inner periphery of the plate in the order 1-2-2-1-3-3, where 1 refers to the first wall 24, 2 refers to the second wall 26, and 3 refers to the third wall 28. The pattern 1-2-2-1-3-3 is repeated eight times round the plate 12, to total forty-eight walls 22, matching the number of slots 16. Intermediate walls 30 are disposed between adjacent third walls 28, having a height approximately the same as the height of the bottom of the upper tangential channel portions 24a and 26a. The intermediate walls 30 are used to support and raise a coil set passing between adjacent third walls 28 to the same level as the cantilevered portions.

A plurality of crossover support posts 32 are preferably located close to the outer peripheral edge of the upper side of the plate 12. The support posts 32 are disposed in groups of three, each group proximate pairs of adjacent second walls 26. The support posts 32 in a group are designated 32a, 32b and 32c respectively in a clockwise direction round the plate 12. Electrical connection terminals 34 are preferably located on the outer peripheral edge of the plate 12 for making electrical connection with the coil sets of the armature.

The end cap 10 described heretofore, including walls 22, support posts 32 and assembly posts 18, except for the electrical connection terminals 34, is made of an electrically insulating material, preferably of a thermoplastic material such as Nylon 66, and can be integrally formed in a one step injection molding process.

The application of the insulating end cap 10 to the armature of an electrical motor is extremely simple and affords several advantages over the prior art. After an armature lamination stack S (FIG. 4) has been formed, in which winding slots have already been punched out, paper liners are inserted in the slots. Since the end cap 10 accepts the stresses during the assembly process, the slot liners used along with the end cap 10 can be formed with the grain running parallel to the lamination stack slot. This means that only a single roll of paper is required for the slot liners, irrespective of the length of the armature. End caps 10 of the present invention are then applied to each end of the stack S. Using the assembly posts 18 to ensure correct registration, the slots 16 in the end cap 10 line up with the slots in the lamination stack S.

Figure 5:
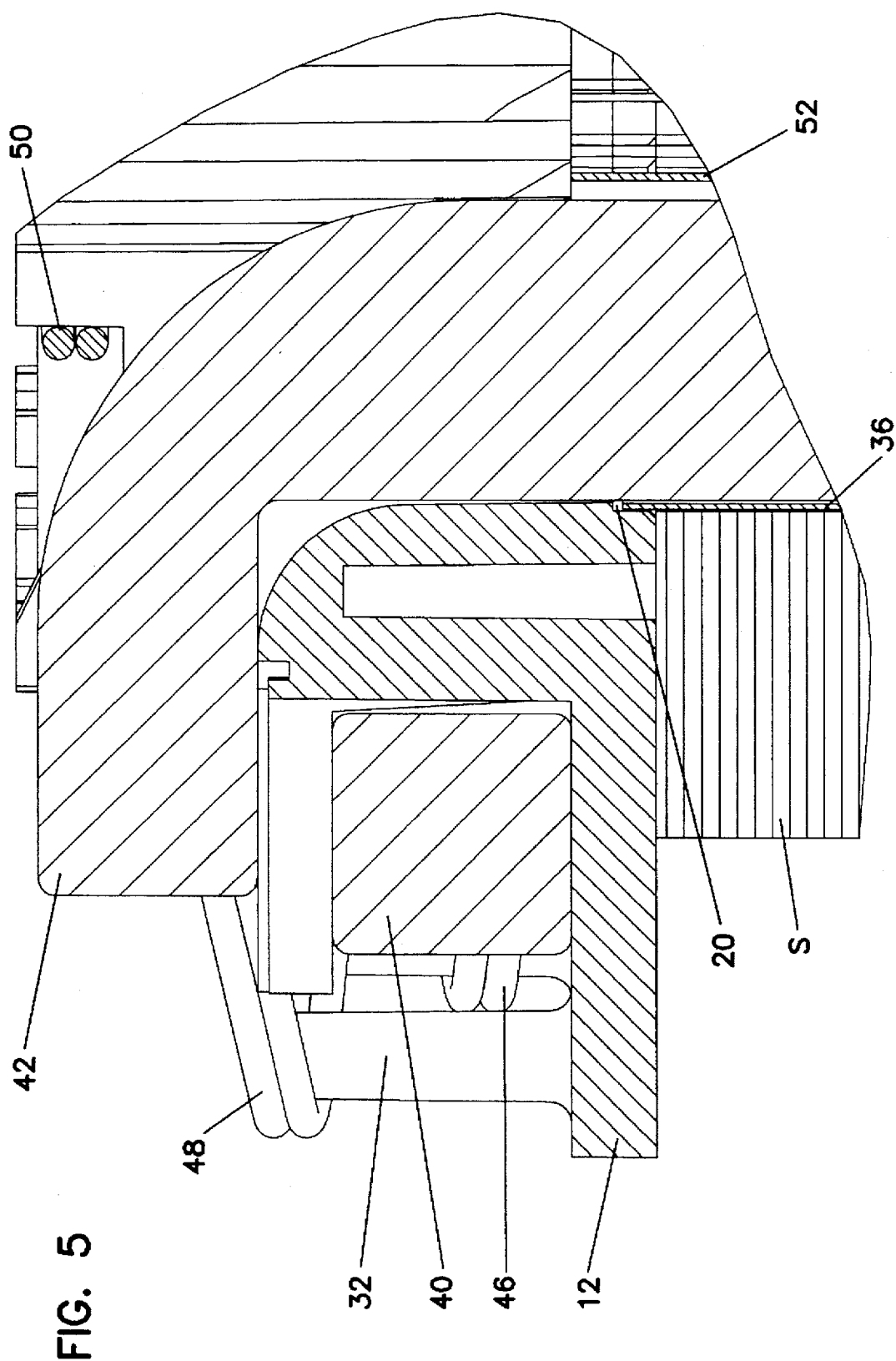
FIG. 5 shows a section through an armature with an end cap.

FIG. 5 shows a cross-section taken through a slot 16 of the end cap 10, the slot containing a coil 42 from the second coil set. The flange portion 20 of the end cap slot 16 registers with the associated lamination stack slot. The upper end of the paper slot liner 36 protrudes above the upper layer of the lamination stack S. The flange portion 20 engages the protruding outer edge of the liner 36 to hold it in place. In addition, level 12b of the plate 12 extends inward to overhang the lamination stack slot by a small amount. The overhang accepts the stresses imposed by the bend of the coil as it enters or exits the end cap 10. Thus, the paper liner is not subject to stress and so liners with the grain running parallel to the lamination stack slot can be used. Also illustrated in FIG. 5 is a paper wedge 52, used to hold the coil within the lamination stack slot and to provide further insulation between the lamination stack and the coil.

The coils are wound in place on the armature by a spindle moving axially and radially in the centrally located hole 14. First, a terminal extension is connected to the terminals 34. Then the spindle winds a first coil for a first phase, forms a crossover to a second coil, winds a second coil, forms a crossover to a third coil and so on around the armature until all the coils for the first phase are wound. The coil set is completed by forming a second connection to the terminals 34. The second and third phases are then sequentially wound using the same procedure as for the first phase. U-shaped paper wedges 52 are inserted in to the lamination stack slots and the armature then undergoes the varnishing process.

Figure 4:
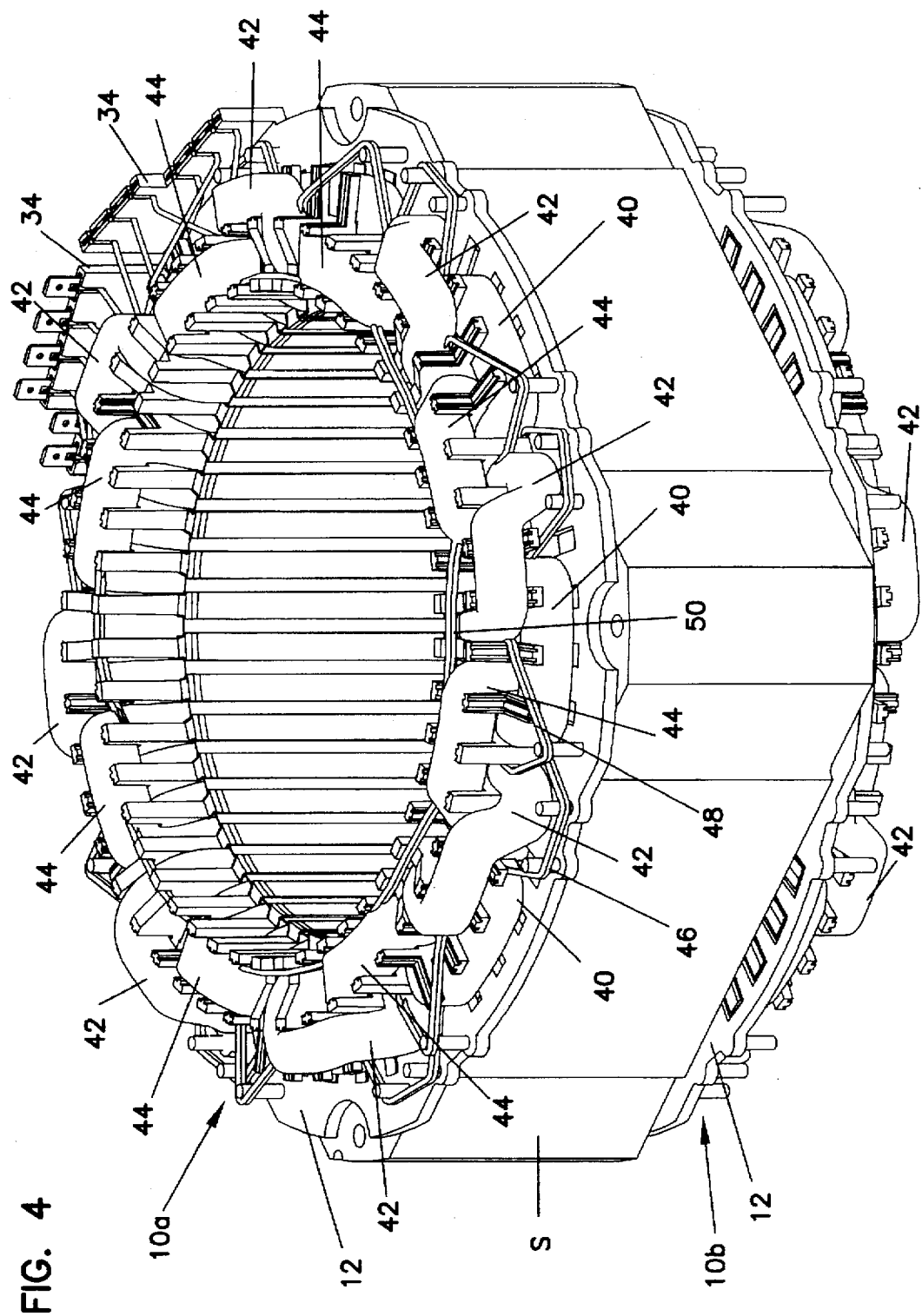
FIG. 4 shows a view of an armature using two end caps of the present invention for insulatively supporting coil sets.

FIG. 4 illustrates a completed armature assembly which has a lamination stack S sandwiched between two identical insulating end caps 10a and 10b. Twenty four coils are disposed around the armature, insulatively held in place by the end caps 10a and 10b. The armature holds three coil sets, each set containing eight coils. The portion of the end cap 10 holding the first set of coils 40 is defined by the undersides of the cantilevered portions 24b and 28b of the first and third walls 24 and 28 and the plate 12. The first set of coils enters the first end cap 10a from a slot in the lamination stack through a slot 16 lying intermediate a first wall 24 and a third wall 28. The first set of coils then exits the end cap 10a through a slot 16 lying intermediate a first wall 24 and a second wall 26 and enters a slot in the lamination stack. Alternately stated, the first coil enters the end cap 10a between the 4th and 5th members of the 1-2-2-1-3-3 wall 22 sequence, and exits the end cap 10a between the 1st and 2nd members of the sequence.

The first set of coils exits the lamination stack slot at the opposite end of the stack and enters the second end cap 10b in a position identical to that described for the first end cap 10a.

The second set of coils 42 is supported at a level higher than the first set of coils 40, but at the same radius as the first set of coils 40. Support for the second set of coils 42 is provided by the upper sides of the cantilevered portions 24b and 28b, the outer side of tangential channel portion 24a, the outer side of the groove portion 28a, and the intermediate wall 30. The second set of coils 42 enters the end cap 10a through a slot 16 lying intermediate the pair of adjacent second walls 26, and at a level below the level of the third set of coils 44. The second set of coils 42 is raised to the upper level by the cantilevered portions 24b and 28b. The second set of coils 42 exits the end cap 10a by passing over the intermediate wall 30 and through a slot 16 lying intermediate adjacent third walls 28, and enters a lamination stack slot. Alternately stated, the second coil enters the end cap 10a between the 2nd and 3rd members of the 1-2-2-1-3-3 wall 22 sequence, and exits the end cap 10a between the 5th and 6th members of the sequence.

The second set of coils exits the lamination stack slot at the opposite end of the stack and enters the second end cap 10b in a position identical to that described for the first end cap 10a.

The third set of coils 44 is supported, at a level higher than the first set 40, by the tangential channel portions 24a and 26a of the first and second walls 24 and 26. The third set of coils 44 is maintained at a radius which is less than that of the first set of coils 40 and the second set of coils 42. The third set of coils 44 enters the end cap 10a through a slot 16 lying intermediate a third wall 28 and a first wall 24 and exits the end cap 10a through a slot 16 lying intermediate a second wall 26 and a first wall 24, to enter lamination stack slot. Alternately stated, the third coil enters the end cap 10a between the 6th and 1st members of the 1-2-2-1-3-3 wall 22 sequence and exits the end cap 10a between the 3rd and 4th members of the sequence.

The third set of coils exits the lamination stack slot at the opposite end of the stack and enters the second end cap 10b in a position identical to that described for the first end cap 10a.

Coil-to-coil crossovers 46, 48 and 50 are provided for electrical connection between adjacent coils of the same set. First crossovers 46 for the first set of coils 40 are supported by support posts 32b and 32c. Second crossovers 48 for the second set of coils 42 are supported by support posts 32a. Third crossovers 50 for the third set coils 44 are supported by the groove portions 28a of the third walls 28. The three sets of coils 40, 42 and 44 are electrically connected to the connectors 50 in a manner appropriate to maintain the correct phase and ground relationship between the sets of coils 40, 42, and 44.

It will be apparent from the foregoing that use of the insulating end cap 10 according to the present invention provides mechanical, insulative support for the end turns of coil windings and for crossovers, thereby removing the need for many components currently required in the assembly of armatures, such as lacing cords, phase blankets, splices and insulative sleeving. Use of the end cap 10 significantly reduces the labor required for assembling an armature, since there is no need for forming coil end turns, stripping insulation, placing insulation sleeving, weaving lacing cord or crimping splices.

Moreover, although the example taught above is for an end turn cap for a three phase armature, it will be understood that the end turn cap can be adapted for armatures having different numbers of electrical phases.

It will, of course, be understood that various modifications and additions can be made to the preferred embodiments discussed hereinabove without departing from the scope or spirit of the present invention. Accordingly, the scope of the present invention should not be limited by the particular embodiments listed above, but should be defined only by the claims set forth below and equivalents of the disclosed embodiments.

What is claimed is:

1. An insulating armature end cap, comprising:

a plate having a central opening and a plurality of slots extending radially outward from the opening; and coil supporting means including raising portions and separating portions disposed on the plate for supporting a plurality of coil sets, and for holding the sets of the plurality of coil sets raised and separated at a plurality of heights above the plate and at a plurality of radial distances from a plate center so as to prevent coil sets from touching other coil sets.

2. The end cap of claim 1, further comprising crossover supporting means for insulatively supporting coil to coil crossovers for each coil set of the plurality of coil sets.

3. The end cap of claim 1, further comprising slot support means for insulatively securing an end of an insulating slot liner.

4. The end cap of claim 1, further comprising mounting means for mounting the end cap to a lamination stack.

5. An insulating armature end cap, comprising:

a plate having a central opening and a plurality of slots extending radially outward from the opening;

a plurality of coil-supporting first walls mounted on the plate, each first wall having a first cantilevered portion and a first channel portion;

a plurality of coil-supporting second walls mounted on the plate, each second wall having a second channel portion;

a plurality of coil-supporting third walls mounted on the plate, each third wall having a third cantilevered portion; and insulating, coil to coil crossover support structure.

6. The end cap of claim 5, further comprising an insulating slot liner support.

7. The end cap of claim 6, wherein the insulating slot liner support comprises a plurality of flange portions positioned on edges of the slots of the plurality of slots.

8. The end cap of claim 5, wherein the insulating, coil to coil crossover support structure comprises a plurality of insulative separating posts on the plate and grooved portions on third walls of the plurality of coil-supporting third walls.

9. The end cap of claim 5, further comprising mounting posts disposed on the plate.

10. The end cap of claim 5, wherein a first third wall of the plurality of coil-supporting third walls is connected to a second third wall of the plurality of third walls by a separating wall having a height approximately equal to a height of a first cantilevered portion.

11. The end cap of claim 5, wherein the first channel portions of the plurality of first walls and the second channel portions of the plurality of second walls form an insulative support for a first coil set; the first cantilever portions of the plurality of first walls and the third cantilever portions of the plurality of third walls form an insulative support for a second coil set; and the first cantilever portions of the plurality of first walls, the third cantilever portions of the plurality of third walls, and the plate form an insulative support for a third coil set.

* * * * *